(12) United States Patent
Croy et al.

(10) Patent No.: US 9,647,891 B2
(45) Date of Patent: May 9, 2017

(54) MANAGING NETWORK CONFIGURATIONS (71) Applicant: International Business Machines Corporation, Armonk, NY (US)

(72) Inventors: Timothy R. Croy, Ballymena (GB); Matthew E. Duggan, London (GB); Robert P. Fulton, Larne (GB); Trevor Graham, Hillsborough (GB); Kevin M. Hamilton, Belfast (GB); David J. Wallace, Belfast (GB)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 14/018,104

(22) Filed: Sep. 4, 2013

(65) Prior Publication Data

US 2014/0068035 A1 Mar. 6, 2014

(30) Foreign Application Priority Data

Sep. 5, 2012 (GB) .................................... 1215800.2

(51) Int. Cl.
*H04L 12/24* (2006.01)

(52) U.S. Cl.
CPC .......... *H04L 41/085* (2013.01); *H04L 41/082* (2013.01); *H04L 41/0866* (2013.01);
(Continued)

(58) Field of Classification Search
CPC ... H04L 1/00; H04L 1/004; H04L 1/24; H04L 29/00; H04L 29/02; H04L 41/00; H04L 41/02; H04L 41/06; H04L 41/0604; H04L 41/0613; H04L 41/08–41/0823; H04L 41/0836–41/0873; H04L 41/0886; H04L 41/0893; H04L 7/00; H04L 7/0016; H04L 12/00; H04L 12/16; H04L 12/24–12/2401; H04L 12/2409; H04L 12/2411;
(Continued)

(56) References Cited

U.S. PATENT DOCUMENTS 6,959,329 B2   10/2005   Thakor
7,062,642 B1    6/2006   Langrind et al.
(Continued)

FOREIGN PATENT DOCUMENTS

WO    2011015488 A1    2/2011

OTHER PUBLICATIONS

Elbadawi et al., "Improving Network Services Configuration Management," Proceedings of the 20th International Conference on Computer Communications and Networks (ICCCN2011), Jul.-Aug. 2011, 6 pages.

*Primary Examiner* — Brian J Gillis
*Assistant Examiner* — Boris Grijalva Lobos
(74) *Attorney, Agent, or Firm* — Yee & Associates, P.C.; Richard A. Wilhelm (57) ABSTRACT

Provided are systems, methods and computer program products that proactively manage configurations that enable a service. Configurations that are critical to enabling a particular service are automatically captured, for example as part of a provisioning activity, and/or tracked in association with that service. This automated, service-oriented configuration management enables improved service assurance and faster identification of problems, and mitigates the problem of errors and compromised service delivery that can arise from misconfigurations.

17 Claims, 5 Drawing Sheets

(52) U.S. Cl.
CPC ...... *H04L 41/0873* (2013.01); *H04L 41/0893* (2013.01); *H04L 41/5054* (2013.01)

(58) Field of Classification Search
CPC ............. H04L 12/2414; H04L 12/2417; H04L 12/2424–12/2426; H04L 12/2428–12/243; H04L 12/2436; H04L 12/2441–12/2448; H04L 12/2602; H04L 12/2618; H04L 43/00; H04L 43/04; G06F 11/00; G06F 11/30–11/3006; G06F 11/3051–11/3055
See application file for complete search history.

(56) References Cited

U.S. PATENT DOCUMENTS

| | | | |
|---|---|---|---|
| 7,065,562 B2 | 6/2006 | Courtney | |
| 7,200,548 B2 | 4/2007 | Courtney | |
| 7,249,170 B2 | 7/2007 | Tindal et al. | |
| 7,360,208 B2* | 4/2008 | Joshi | G06F 8/65 709/220 |
| 7,385,938 B1 | 6/2008 | Beckett et al. | |
| 7,461,158 B2 | 12/2008 | Rider et al. | |
| 7,519,731 B1 | 4/2009 | Enns | |
| 7,702,741 B2* | 4/2010 | Yuan | G06F 17/30575 709/208 |
| 8,059,558 B2 | 11/2011 | Oman | |
| 8,161,521 B1* | 4/2012 | Venable, Sr. | G06F 21/6218 713/153 |
| 2002/0069271 A1* | 6/2002 | Tindal | H04L 41/0843 709/221 |
| 2003/0101341 A1* | 5/2003 | Kettler, III | G06F 21/6245 713/162 |
| 2003/0131077 A1 | 7/2003 | Hogan | |
| 2004/0003266 A1* | 1/2004 | Moshir | G06F 8/65 713/191 |
| 2004/0015949 A1* | 1/2004 | Taylor | G06F 8/71 717/171 |
| 2004/0078457 A1 | 4/2004 | Tindal | |
| 2004/0088403 A1 | 5/2004 | Aggarwal | |
| 2004/0205709 A1* | 10/2004 | Hiltgen | G06F 8/65 717/115 |
| 2005/0066019 A1* | 3/2005 | Egan | G06F 8/65 709/223 |
| 2005/0120106 A1* | 6/2005 | Albertao | G06F 8/65 709/223 |
| 2005/0135601 A1* | 6/2005 | Whitman, Jr. | H04M 3/51 379/266.08 |
| 2005/0256961 A1 | 11/2005 | Alon et al. | |
| 2005/0262076 A1* | 11/2005 | Voskuil | G06F 8/65 |
| 2005/0273851 A1* | 12/2005 | Raju Datla | H04L 63/1433 726/14 |
| 2006/0184714 A1* | 8/2006 | Dang | G06F 8/65 711/100 |
| 2007/0288989 A1* | 12/2007 | Aarnos | G06F 21/53 726/1 |
| 2008/0155423 A1 | 6/2008 | Moran et al. | |
| 2008/0184078 A1 | 7/2008 | Herriott et al. | |
| 2008/0243525 A1* | 10/2008 | Clark | G06F 8/65 705/1.1 |
| 2010/0023604 A1 | 1/2010 | Verma et al. | |
| 2010/0106958 A1* | 4/2010 | Watanabe | G06F 21/552 713/100 |
| 2010/0205650 A1* | 8/2010 | Terry | G06F 21/57 726/1 |
| 2010/0241748 A1* | 9/2010 | Ansari | G06Q 30/04 709/225 |
| 2011/0004914 A1 | 1/2011 | Ennis et al. | |
| 2011/0154255 A1* | 6/2011 | Ryu | G06F 15/16 715/810 |
| 2012/0017259 A1* | 1/2012 | MacCarthaigh | H04L 29/12066 726/1 |
| 2012/0084412 A1* | 4/2012 | Burns | H04L 41/0893 709/221 |
| 2014/0040875 A1* | 2/2014 | Bower, III | G06F 8/65 717/170 |
| 2014/0359593 A1* | 12/2014 | Cohen | G06F 8/65 717/169 |

* cited by examiner

MANAGING NETWORK CONFIGURATIONS

CROSS REFERENCE TO RELATED APPLICATIONS

This Application claims the benefit of priority to United Kingdom Patent Application Serial No. 1215800.2, filed on Sep. 5, 2012, the contents of which are hereby incorporated by reference.

FIELD OF THE INVENTION

The present invention relates generally to information technology, and more particularly to the field of network and systems management.

BACKGROUND

The demand for fast and reliable data communications is currently high, and is likely to increase in the future. End users of data transmission services such as telecommunications and cable television services typically use two main criteria to judge the quality of a service: speed and reliability.

Entities that provide data transmission services are often required to manage networks that include many individual network components that are widely distributed in a geographical sense. This network infrastructure has made it necessary to provide a facility for remotely configuring each network component, as it is not practical or cost effective in many cases to locally configure or reconfigure each network component every time a change is made within the network. Moreover, configuration changes may be made on a regular basis and may be made at a network wide level.

The correct configuration of each network component is typically crucial to the smooth operation of the network as a whole. Misconfigured components can result in sub-optimal network performance that results in a slower end user experience. In some cases a misconfigured network component may completely suspend data traffic across part or all of a network, resulting in an interruption of service for some or all of the network's end users. Both of these situations are clearly undesirable from the point of view of all parties involved, as the end user experiences slow and/or unreliable service which translates into dissatisfaction with the entity administering the network and its associated services.

Compounding the above is the fact that a misconfigured network component can become unresponsive to remote instructions, necessitating a time consuming visit to the location of the unresponsive component to gain access to it in order to reconfigure it to work correctly. During this time the end users may experience slow service, or even a complete lack of service.

Existing network configuration and management solutions are reactive type solutions that typically focus on detecting network and equipment failures as soon as possible after they have occurred, with a view to identifying and fixing problems before they have a chance to significantly affect the service experienced by the end users of the network.

These reactive solutions suffer from two problems.

Firstly, a network component has to fail before a problem is detected. Even if the problem is detected and fixed rapidly, there will still be some time period in which the misconfigured component is not active and the delivery of the service will be compromised.

Secondly, a network component that is misconfigured to an extent that it is still functional but performing sub-optimally will not necessarily be detected by a reactive solution. The network component may remain misconfigured until a configuration update is applied across the network, which may not be until a significant time has passed. In some cases the network fault may not be identified until an end user reports a problem with their service to the entity managing the network.

Moreover, once a network fault has been detected, it may then be difficult to identify which network component is the root cause of the problem. Time consuming tests may have to be carried out involving many network components before the one that has been misconfigured is identified, possibly causing network disruption and so prolonging the period of disrupted service. Alternatively, an inefficient 'blanket' update approach may be taken where an update is applied across a portion of the network in the hope that the misconfigured component is reconfigured correctly, possibly causing disruption to that portion of the network while the update is applied.

In some cases, reconfiguring a misconfigured network component involves manually altering its configuration settings. This is often achieved via a command line interface (CLI) that requires a human to have memorized a number of commands, with the set of commands differing according to the specifics of the network component being accessed. This manual reconfiguration process is therefore slow, error prone and complex.

In addition to the above problems, in existing network management solutions it is often difficult or even impossible to identify the set of network components that are associated with providing a particular end user service. It may therefore be difficult to correlate reports of end user service problems with components of the network, extending the time between an end user reporting a service problem and the resolution of this problem. There may be a large number of network engineers working on a given network at any one time, each potentially without knowledge of network configuration changes made by the other engineers. This can lead to a situation where counterproductive network configuration changes are made by each engineer, further lengthening the time taken to diagnose and fix a service distribution problem.

Thus, it is clear that existing network and systems management solutions suffer from various limitations that can result in end users experiencing overly long periods of unsatisfactory service. Therefore, a need exists for improved network management and configuration systems.

BRIEF SUMMARY OF THE INVENTION

Disclosed herein are systems, methods and computer program products that proactively manage configurations that enable a service. Configurations that are critical to enabling a particular service can be captured and/or tracked in association with that service.

One aspect of the present invention provides a method for managing network configurations for service enablement, comprising:

storing first configuration information for a set of network devices;

determining one or more required configuration changes to devices in the set of network devices to provide a configured set of network devices that enable a service; and automatically generating a service policy representing a set of network configuration information elements for the configured set of network devices that enable the service, and saving the service policy in association with the service.

Embodiments of the invention enable service-oriented configuration capture and change tracking. Particular embodiments capture, during a provisioning activity, the elements of network configuration information that are critical to supporting a service. Particular embodiments enable evaluation of changes or proposed changes to network component configurations. If the changes or proposed changes to the configuration of a network component are determined to have the potential to detrimentally affect service delivery, then a network administrator may be informed and/or the configuration change may be backed out or prevented. The determination may involve comparing a proposed configuration with a 'service policy' that provides configuration information for a set of devices and/or other resources on which a service depends. This policy can be created as part of or subsequent to a network provisioning activity. Other embodiments use service policies to resolve service delivery problems after they occur—providing a reliable and easily accessible indication of the set of devices, resources and configuration information that is required for the particular service.

A second aspect of the invention provides a system for managing network configurations for service enablement, comprising:

a data store for storing first configuration information for a set of network devices; and a configuration manager for determining one or more required configuration changes to devices in the set of network devices to provide a configured set of network devices that enable a service, and for automatically generating a service policy representing a set of network configuration information elements for the configured set of network devices that enable the service, and for saving the service policy in association with the service.

A configuration manager according to the invention may be implemented as a computer program product that is provided as program code embodied on a recording medium, and configured to control the performance of operations on a data processing apparatus on which the program code executes, to perform a method as described above.

Viewed from a further aspect, the present invention provides a computer program product for managing network configuration, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when the program is run on a computer, for performing the steps of the invention.

Viewed from a further aspect, the present invention provides a method, system and configuration manager substantially as described with reference to figures.

BRIEF DESCRIPTION OF THE DRAWINGS

Preferred embodiments of the present invention will now be described, by way of example only, with reference to the following drawings in which.

DETAILED DESCRIPTION OF THE EMBODIMENTS

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

Figure 1:
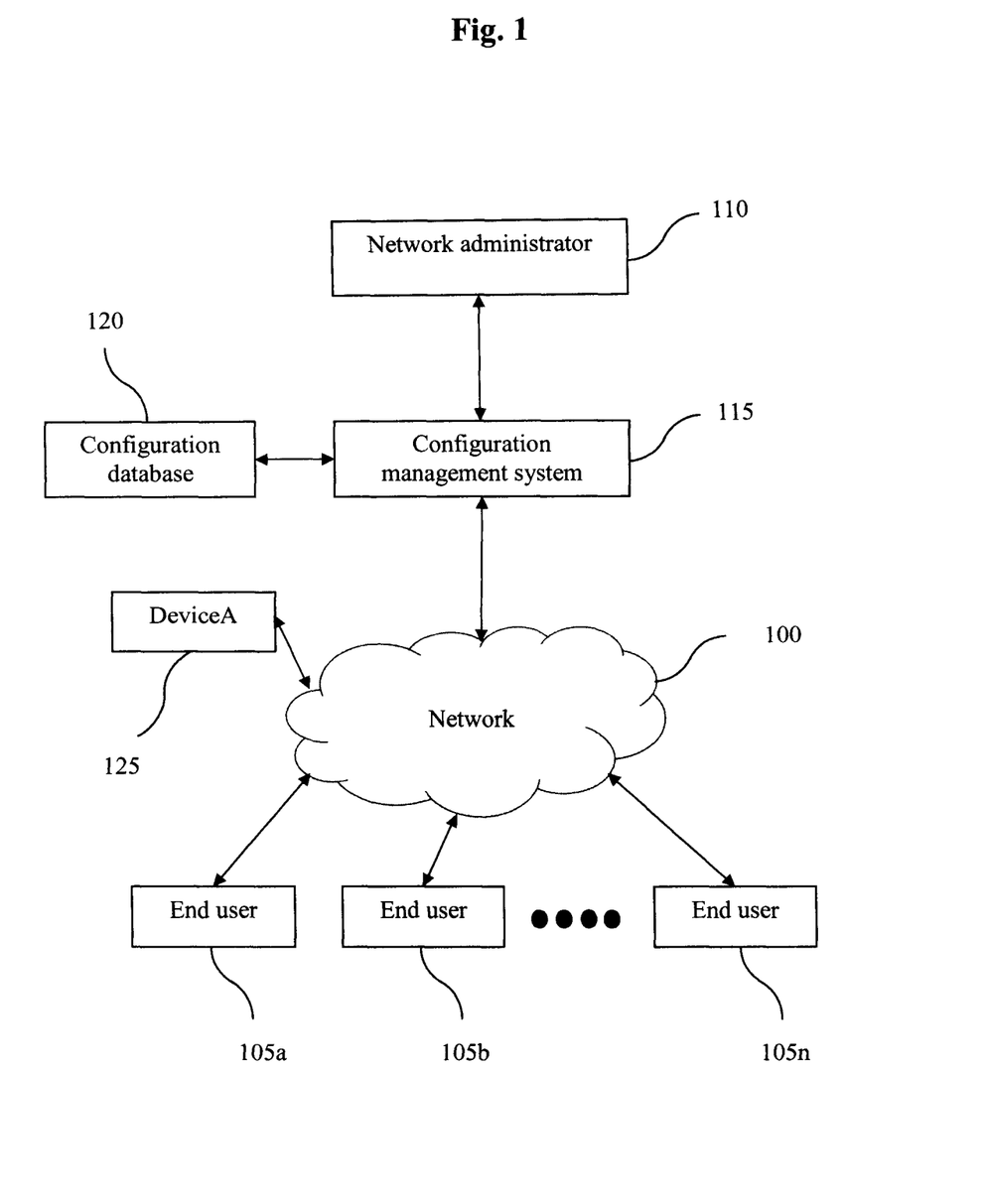
FIG. 1 is a block diagram illustrating an infrastructure used for managing configuration changes in a network.

Referring now to the Figures, FIG. 1 is a block diagram illustrating an infrastructure used for managing configuration changes in a network that may be used with the embodiments described herein. FIG. 1 includes a network 100 that is communicatively coupled to a plurality of end users 105a, 105b . . . 105n. Network 100 may be any type of network known in the art of computing, including a telecommunications network or a packet switched network. Network 100 includes a plurality of interconnected data processing devices such as notional device 'DeviceA' 125 shown in FIG. 1. The interconnected data processing devices may be, for example, computers and routers, each of which has an associated network configuration that allows it to remain in communication with the rest of the network and/or end user devices 105a, 105b . . . 105n. The associated network configuration may be stored on each device on a storage medium such as a RAM, ROM, HDD or Flash memory.

End user devices 105a, 105b . . . 105n make use of network 100 for one or more services such as telecommunications services, internet services, television and/or radio broadcast receiving services and the like. The services are supplied by a supplier and the network is managed and maintained by a network administrator 110.

The network administrator 110 comprises any means known for managing a network, including one or more computers running appropriate software such as the IBM® Tivoli® Netcool®/OMNIbus operations management software developed and supplied by the assignee of the present application. Some or all of the functions of this software may be human controlled, or some or all of the functions may be automatically controlled with little or no direct human involvement. IBM, Tivoli, and Netcool are trademarks of International Business Machines Corporation, registered in many jurisdictions worldwide.

Network administrator 110 is communicatively coupled to a configuration management system 115 that is itself communicatively coupled to network 100. Configuration management system 115 comprises any suitable means for configuring network 100 such as one or more computers running appropriated software such as the IBM Tivoli Netcool Configuration Manager and OMNIbus software developed and supplied by the assignee of the present application. Configurations management system 115 is communicatively coupled to a configuration database 120 that stores configuration information associated with network 100. Configuration database 120 may be any type of storage device known in the art of computing such as one or more hard disk drives (HDD's).

A method by which configuration management system 115 provisions network 100 to provide a service according to an embodiment is now described with reference to FIG. 2. As used herein, the terms 'provision' or 'provisioning' refer to steps of setting up network resources to provide one or more services, including configuring the various components of a network. In the embodiment described below, these set up steps are automated or semi-automated. Further detail is provided later in this detailed description.

Firstly, in step 200, a pre-provisioning model of network 100 is created by configuration management system 115. In the present embodiment, the model includes at least one of configuration data and/or hardware details for one or more devices such as DeviceA 125 in network 100. This may include any kind of information about the devices. For example this may include configuration and state information, such as device ID, model number, IP address, communication port(s), operating system, memory, card identification and description and/or any other hardware associated with the device. In the present embodiment the pre-provisioning model may include details of the configuration and/or hardware of one or more end user devices 105*a*, 105*b* . . . 105*n*.

The configuration of a device in network 100 may be stored as a series of strings. One exemplary configuration for a notional device DeviceA 125 is shown below:
DeviceA Configuration:

```
interface GigabitEthernet0/1
    ipaddress 10.1.1.1 255.255.255.252
    ip access-group 1 in
    ip router isis
    duplex auto
    speed auto
    service-policy input NEWPOL
end.
```

A configuration such as DeviceA 125 configuration may be used to create a model of a device. The model may be expressed in Extensible Markup Language (XML) format. The model of the device may contain at least some, and preferably all, aspects of the device's configuration. Each individual aspect may be referred to as a 'configuration item'. As an example, a model of DeviceA 125 that is based on the aforementioned DeviceA 125 configuration is shown below:
DeviceA Model:

```
<interface>
  <GigabitEthernet>
    <ARG.001>0/1</ARG.001>
    <ip>
      <address>
        <ARG.001>10.1.1.1</ARG.001>
        <ARG.002>255.255.255.252</ARG.002>
      </address>
      <access-group>
        <ARG.001>1</ARG.001>
        <in/>
      </access-group>
      <router>
        <isis/>
      </router>
    </ip>
    <duplex>
      <auto/>
    </duplex>
    <speed>
      <auto/>
    </speed>
    <service-policy>
      <input>
        <ARG.001>NEWPOL</ARG.001>
      </input>
    </service-policy>
  </GigabitEthernet>
</interface>
```

It will be appreciated that DeviceA 125 configuration and DeviceA 125 model are provided purely as examples to assist the reader's understanding, and that configurations and models created according to embodiments described herein may include some, all or none of the configuration items shown in DeviceA 125 configuration and DeviceA 125 model, and may include additional configuration items not shown in these examples.

In addition to configuration details, in some embodiments the device model includes a device hardware list. This may include information regarding some or all of the hardware components that are part of a device. The device hardware list may be stored as a series of strings in a manner similar to the device configuration discussed earlier.

The device hardware list may be used to create a hardware model of the device. This may be expressed in XML format. A device hardware model may be combined with a device configuration model to form a single model that captures both the hardware and configuration of a device. This combined model may be expressed in XML format.

In step 200 any appropriate means for obtaining the necessary information to create a pre-provisioning model of network 100 may be used. In the present embodiment, configuration management system 115 initiates a network synchronization event to poll the configuration of one or more devices such as DeviceA 125 within network 100. One or more of End users 105*a*, 105*b* . . . 105*n* may also be polled. The configurations and/or hardware details of the polled devices are returned to configuration management system 115 and collated to create the pre-provisioning network model. This process of creating the pre-provisioning network model may be achieved using the aforementioned IBM Tivoli Netcool Configuration Manager software.

In step 210 the pre-provisioning network model created in step 200 is stored in a data store such as configuration database 120.

In step 220 a service provisioning activity is carried out by configuration management system 115, possibly on the instructions of network administrator 110. The provisioning activity involves configuring one or more resources within network 100 appropriately such that it or they can communicate with the rest of network 100 and/or end user devices 105*a*, 105*b* . . . 105*n* to provide one or more services to some or all end users. Examples of resources that may be configured during the service provisioning activity are devices such as DeviceA 125, ports, interfaces, network level objects such as a Virtual Local Area Network (VLAN), and/or any other network constructs that are a fundamental requisite for service delivery. In the exemplary configuration DeviceA 125, the IP address 10.1.1.1 and the interface GigabitEthernet0/1 may be considered to be resources.

The resources may be tightly managed during the service provisioning activity, and may be explicitly specified or defined during service provisioning.

The service provisioning activity may also include configuring end user devices 105*a*, 105*b* . . . 105*n* for receiving one or more services. Service provisioning may be achieved by applying one or more predefined 'service provision templates' or 'service instance templates' (also known as 'command-sets' in the case of products such as IBM Tivoli Netcool Configuration Manager) to the one or more devices within network 100 that are being provisioned. A service instance templates may include details of the configuration items that should be in place in order to deliver a particular service. Referring to the DeviceA 125 example from earlier, a service instance template may contain details of an interface which must be created: e.g. create interface GigabitEthernet0/1.101. A service instance template may also include details of how an interface should be configured, e.g. that the IP address '10.1.1.1' should be assigned to the interface. Other configuration items such as duplex settings or any security criteria may also be defined in the service instance template. A service instance template may be parameterised and hence generic. For example the interface number '0/1.101' and IP address '10.1.1.1' may be different and supplied to a generic template for each service provisioning request.

The service provisioning activity of step 220 may involve selecting an appropriate service provision template from a set of service provision templates according to parameters such as the type, version ID and/or model number for each network device that is to be provisioned and then applying the selected service provision template to the network device. The service provision templates may be stored in configuration database 120 and the selection of an appropriate template may be carried out by configuration management system 115. The aforementioned IBM Tivoli Netcool Configuration Manager software may be used to carry out the service provisioning activity.

A service provision template may be predefined; i.e. before a network provisioning activity is carried out. It may be specific to a set or family of devices that share similar characteristics, such as all devices having the same model number or a family of devices including a range of related models. A family may be defined as a set of devices that expose logical configuration interfaces that share similar syntax and behavioural characteristics. A service provision template may or may not be specific to a particular service provisioning activity. In the case that it is not specific to a particular service, it may be suited for use with many different service provisioning events. As an example, a service provision template that simply sets up a device so that it is ready to communicate in network 100 may be used when provisioning many different services. A plurality of sequentially applied service provision templates may be used to provision one particular service. A service provision template may be applied to a single device or it may be applied to a set of devices, either sequentially or concurrently. A service provision template may include of all or part of a service instance template, or it may include one or more service instance templates.

Following the completion of the service provisioning activity, in step 230 a post-provisioning network model is created. The post-provisioning network model may be created immediately after the service provisioning activity of step 220 so that the post-provisioning network model captures the configuration of network 100 at this time.

The post-provisioning network model may be created in much the same manner as the pre-provisioning network model created in step 200 and may include the same or similar elements. A network synchronization event may be used to poll the configurations of one or more devices such as DeviceA 125 within network 100 to create the post-provisioning network model. The post-provisioning network model created in step 230 may include configuration and/or hardware information associated with all of the devices in network 100, or it may include configuration and/or hardware information associated with only some of the devices in network 100. The post-provisioning model may include configuration and/or hardware information associated with one or more end user devices 105*a*, 105*b* . . . 105*n*.

In step 240 the post-provisioning network model created in step 230 is stored in a data store such as configuration database 120.

In step 250 a comparison of the pre and post-provisioning network models is carried out and in step 260 this comparison is used to generate a service policy that is associated with the provisioning activity carried out in step 220. Further details on these two steps are provided below.

The comparison of step 250 may be carried out by configuration management system 115 and may be carried out automatically without the need for human input. In the present embodiment the comparison includes comparing the pre and post-provisioning configurations of one or more devices in network 100. A set of configuration changes or 'deltas' may be created from this comparison. If service templates and/or service policies were used in the service provisioning activity of step 220, they may be used as input to guide the comparison and the subsequent creation of the service instance template. In particular, configuration management system 115 may refer to one or more service provision templates, service instance templates and/or any existing service policies to identify which deltas are related to the provisioning of a particular service; that is, configuration management system 115 may be able to determine the precise changes to network 100 that were caused by or are otherwise a result of the provisioning of a particular service.

In some embodiments a plurality of services may be provisioned concurrently. This may result in a set of deltas that are not all related to a single service. In this case configuration management system 115 may use one or more service provision templates, service instance templates and/or service policies to correlate the deltas with the provisioned services so that it is possible to identify, for each of the plurality of services, a set of associated configuration items.

In step 260 configuration management system 115 creates at least one service policy based at least in part on the comparison of step 250. A service policy as described herein may be defined as a set of rules and conditions to which a device configuration must adhere to in order to ensure service delivery. If changes are made at some time after the service has been activated in the network such that a configuration breaches the rules and conditions then delivery of the service may potentially be compromised. A service policy may be defined for an individual device, or it may be defined for a plurality of devices. In some embodiments one or more service policies may be created automatically following a provisioning activity.

A service policy according to embodiments described herein is understood to contain the details of the configuration items and/or hardware that are required to enable an instance of a service. Here 'enable' is understood to include configuration items and/or hardware that are relevant to the service instance. This includes configuration items that are configured as part of a provisioning process and the configuration items or hardware that are a prerequisite for the existence of these configuration items. Referring again to the DeviceA 125 example, to create interface GigabitEthernet 0/1.101 interface GigabitEthernet 0/1 must already exist; that is, the existence of interface GigabitEthernet 0/1 is a prerequisite for the creation of interface GigabitEthernet 0/1.101.

During the provisioning process a new interface may be created or an existing interface may be modified. The creation or modification of an interface is the type of data stored by a service policy. Where an interface is modified, the existence of the interface itself is clearly a prerequisite for this modification and hence this information would also be stored in a service policy.

A service policy may also include configuration items that are not directly modified or created during a provisioning activity but are related to or associated with configuration items that are directly modified or created during a provisioning activity. In some embodiments, one or more of the service provision templates may have associated therewith a service policy.

Referring to the example of DeviceA 125, a service policy could be used to define a rule that the duplex setting of DeviceA 125 must be 'auto'. If the configuration of DeviceA 125 is subsequently modified such that the duplex setting is changed to 'half' then the rule would be breached and delivery of the service may potentially be compromised.

The service policies created in step 260 may be generated automatically without any human input or involvement. A service policy created according to step 260 captures at least some of the device configuration items that are associated with the provisioning of the service carried out in step 220, so that the service policy captures only those configuration items that are related to the service in question. This means that a service policy created according to step 260 can be used to identify and possibly prevent subsequent changes to device configuration items that may compromise delivery of the service. These changes may occur after the provisioning activity is complete and network 100 is providing one or more services. In some embodiments a plurality of service policies may collectively capture all of the device configuration items associated with the provisioning of the service carried out in step 220.

The ability to automatically identify and capture configuration changes relating to the provisioning of a particular service is advantageous at least in that it allows the impact of subsequent proposed or actual changes to the network to be assessed on a service by service basis. The skilled reader will immediately appreciate at least the benefits in network management and network maintenance that this provides. Furthermore, since the changes to network 100 are monitored automatically at provisioning time, embodiments described herein also provide an effective and reliable means for capturing such changes without costly and error prone human input.

In addition, a service policy created in step 260 captures the network configuration information and network devices and other resources that underpin a service or set of services regardless of device type and configuration syntax, resulting in a highly reliable and accurate representation of the network configuration and devices and resources on which a service or set of services depends.

If an end user reports a problem with a particular service, the relevant service policy or policies may be consulted to quickly determine the set of network devices that are associated with this service and then further identify from this set which device(s) are misconfigured. The device configuration items stored in the service policy or policies may also be used to reconfigure the misconfigured device(s), possibly with input from one or more service provision templates and/or service instance templates. This process may be carried out by configuration management system 115 with little or no input from network administrator 110, allowing the present embodiment to advantageously offer rapid resolution to service distribution problems.

Moreover, the service policies of the present embodiment allow the network resources and configurations of a particular network service or end user service to be tracked easily. This is because the individual network device(s) that are associated with providing a particular service are readily identified from the service policy or policies associated with the service in question.

It will be appreciated that the service configuration method of the present embodiment can be carried out each time network 100 is configured to provide a new service or set of services. A set of service policies can be created, each corresponding to a particular service or set of services. These may be aggregated to form a collection of service policies that is stored in a data store such as configuration database 120. The collection of service policies may be used to provide an identification, for each device in network 100, of a set of services that depend on the device. This service dependency information may be analyzed to detect 'critical' devices on which a large number of services depend, or 'single point of failure' devices that could cause network wide service disruption if they were to fail. This information can advantageously be used to assist in network re-engineering and service migrations, as well as to assist in the recovery of so-called 'stranded' devices that have become lost on the network once a service has been stopped.

The service policies of the present embodiment also have applications in network monitoring and in real time network monitoring. A network monitoring method according to an embodiment that is capable of detecting changes to a network configuration that may detrimentally affect one or more services provided by said network will now be described with reference to FIG. 3.

Figure 3:
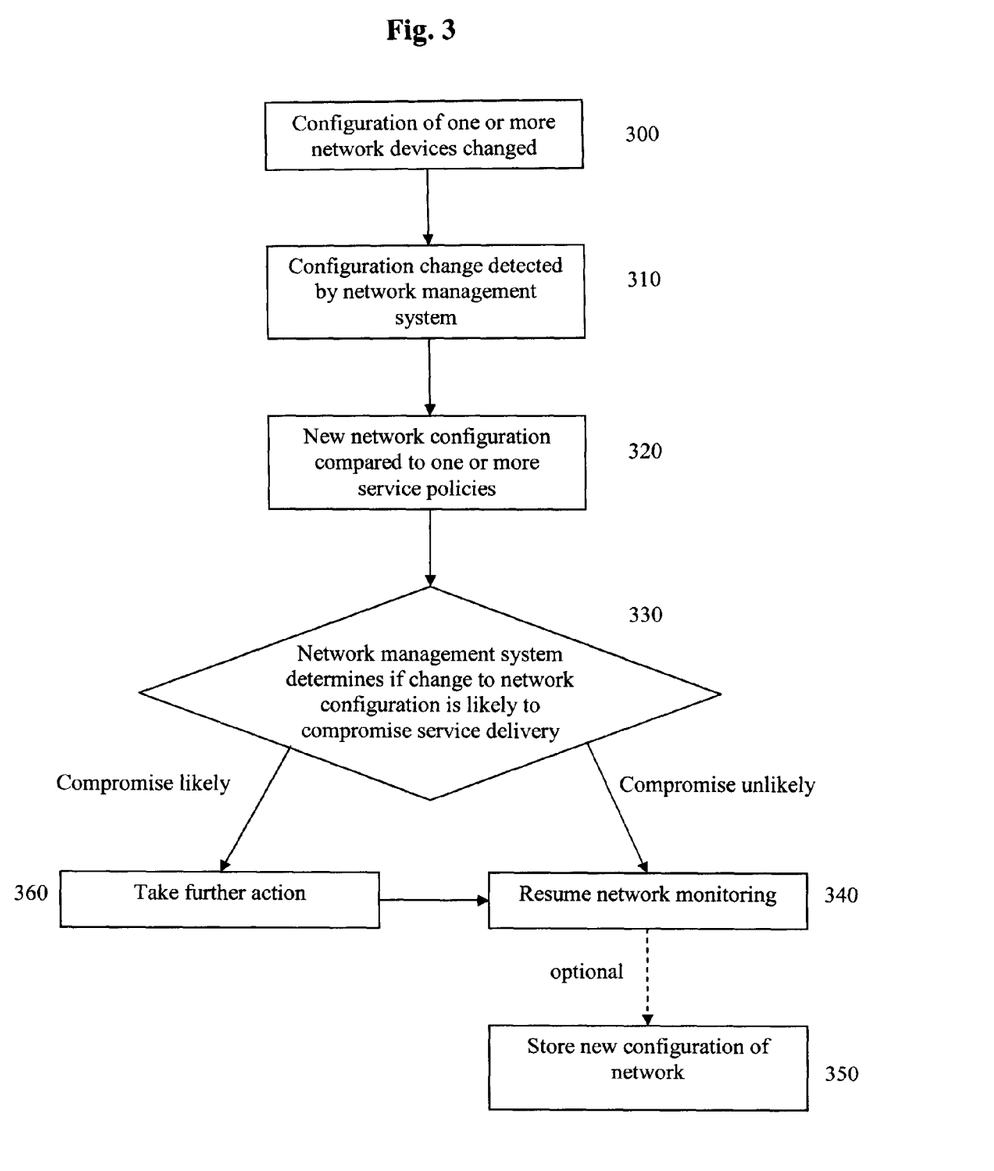
FIG. 3 is a flow diagram showing a network monitoring method according to an embodiment.

The network monitoring method of this embodiment of the invention can be implemented within a service assurance system. In the present embodiment this comprises an entity such as configuration management system 115 running the aforementioned IBM Tivoli OMNIbus software and implementing a Simple Network Management Protocol (SNMP) trap as is known in the art. However, other suitable systems for carrying out the network monitoring method of this embodiment will be apparent to the skilled person having the benefit of the teaching contained herein. The network monitoring method of this embodiment may be carried out in substantially real time.

Firstly in step 300 the configuration of one or more of the devices within network 100 is made. The change may be made by configuration management system 115, possibly at the request of network administrator 110. Alternatively the change may be made by the network device itself in response to an action such as a request from an end user 105*a*, or it may be made by an on or off-site network engineer.

In step 310 the change in the configuration of the one or more network devices is detected by configuration management system 115. Configuration management system 115 may passively detect the change by periodically requesting a network synchronization to poll the configurations of each device within network 100, with the results of this poll being compared with a stored configuration set representing the configuration of each device within the network before the synchronization request. Alternatively, some or all of the devices within network 100 may be configured to actively report to configuration management system 115 each time their configuration is changed. A combination of these 'active' and 'passive' reporting methods may be used. Each time a configuration change is detected or reported configuration management system 115 may update a stored configuration set representing the configuration of each device within the network. This configuration set may be stored in configuration database 120.

Figure 2:
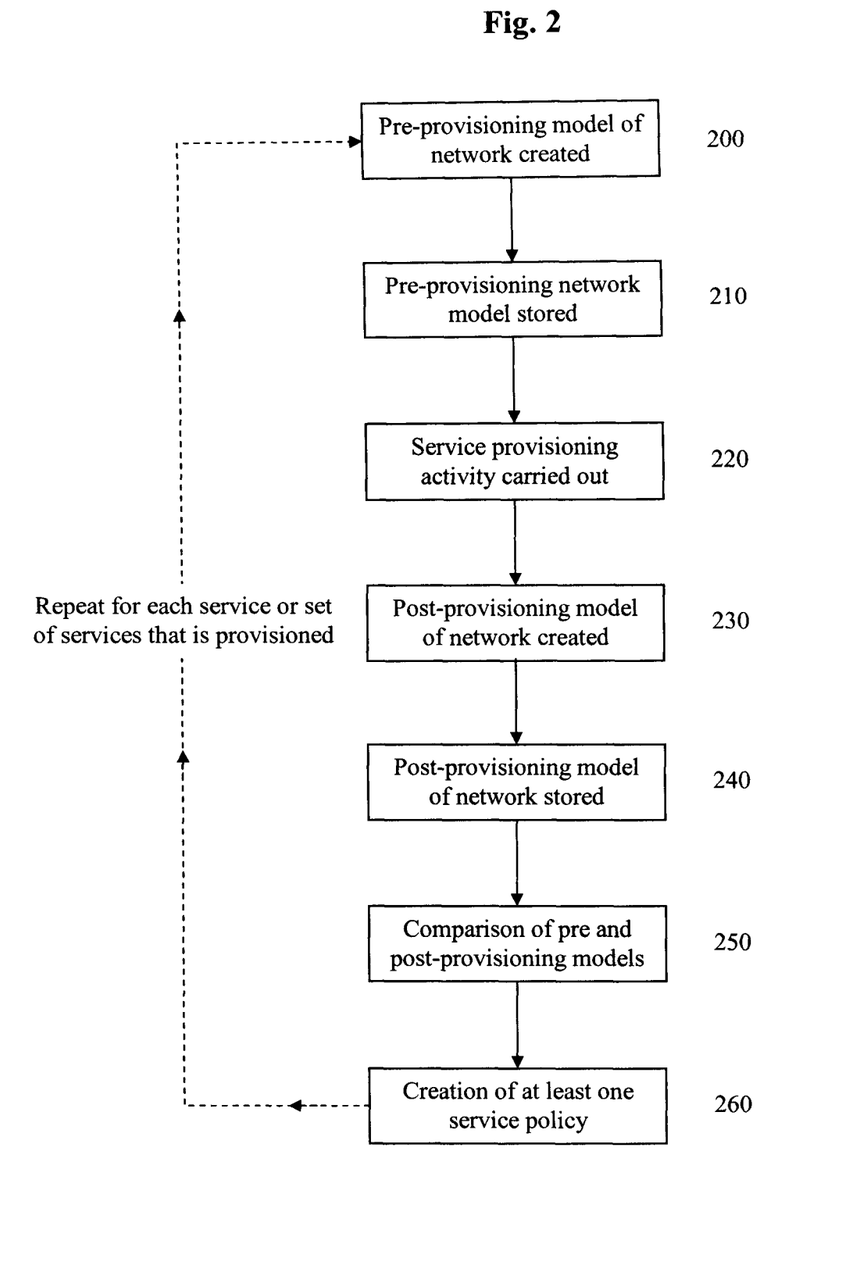
FIG. 2 is a flow diagram showing a method according to an embodiment by which a network may be configured to provide a service.

Following the configuration change, in step 320 the new network configuration is compared to one or more service policies, such as the service policies created in step 260 of the embodiment of FIG. 2. This comparison may be carried out by configuration management system 115. Configuration management system 115 may be configured to carry out a comparison between the new network configuration and one or more service policies to detect changes that may compromise the delivery of one or more services being provided by network 100. The service policy or policies that are used in comparison step 320 may be associated with one or more service instance templates that are themselves associated with the services that network 100 is currently providing.

In step 330 configuration management system 115 makes a determination as to whether the new configuration of network 100 has the potential to compromise or is likely to compromise the delivery of one or more services provided by network 100. In the present embodiment the determination is based at least in part on the comparison of step 320 between the new configuration of network 100 and the service policy or policies, with changes away from a service-enabling configuration being flagged as potentially problematic. If configuration management system 115 determines that the new network configuration in unlikely to compromise the delivery of any services provided by network 100 then in step 340 configuration management system 115 resumes monitoring network 100. Resuming monitoring network 100 may include optional step 350, in which a network model representing the new configuration of each device within the network is stored, possibly in a data store such as configuration database 120.

If configuration management system 115 determines that the new network configuration is likely to compromise the delivery of any services provided by network 100, then in step 350 configuration management system 115 takes further action. This may include notifying an appropriate entity, such as network administrator 100 and/or a network engineer, that the network configuration changes made in step 300 may negatively impact the delivery of one or more services. The facility for reporting may be implemented by software such as the IBM Tivoli OMNIbus software developed and supplied by the assignee of the present application. In an embodiment where the IBM Tivoli OMNIbus software is used, notifications may be displayed on an IBM Tivoli OMNIbus events list to provide a notification of the network configuration changes having the potential to impact delivery of one or more services.

In step 360 configuration management system 115 may take action to roll back the network configuration changes that were made in step 300. This may be achieved by applying the configuration of a stored network model representing the network before change was made. If such a network model is unavailable, configuration management system 115 may use one or more service instances templates and/or service policies to restore the network configuration to its pre-change state. Alternatively configuration management system 115 may contact network administrator 110 and/or the entity that made the change in step 300 to request that the network configuration be rolled back to its pre-change state.

Configuration management system 115 may produce a report for review by an appropriate entity such as network administrator 110 or a network engineer. The report may identity the particular changes to network 100 that are believed to impact negatively on the delivery of one or more services and may identify the device(s) associated with these changes using a unique identifier such as device IP address. Further, the report may identify the time and date that these changes were made and/or the entity that made the changes. The report may also include a list of services that configuration management system 115 has determined are likely to be detrimentally affected by the network configuration change made in step 300. In addition to or instead of this, the report may include a list of all the services that are dependent on the devices in network 100 that have been reconfigured. This advantageously allows the full network-wide impact of a requested change to be tracked.

After taking further action, configuration management system 115 resumes monitoring network 100.

It will be appreciated that the network monitoring method of this embodiment advantageously provides a means for identifying changes to a network configuration that may compromise service distribution. This allows potential problems to be identified and fixed before they become significant, possibly even before any end users have even become aware that their service or set of services was or could have been compromised. The use of the service policy or policies created according to embodiments described herein allows a reliable and robust evaluation of the impact that a modification to a network configuration has on each service implemented by the network, resulting in an improved service or set of services.

A network monitoring method according to an embodiment that is capable of detecting changes to a network configuration that may detrimentally affect one or more services provided by said network before the changes are applied will now be described with reference to FIG. 4. There are some similarities between this method and the method shown in FIG. 3, so for the sake of brevity description of like elements will not be duplicated. It is contemplated that the network monitoring method of this embodiment will be carried out by a service assurance system of the type as described earlier in connection with FIG. 3. The network monitoring method of this embodiment may be carried out in substantially real time.

Figure 4:
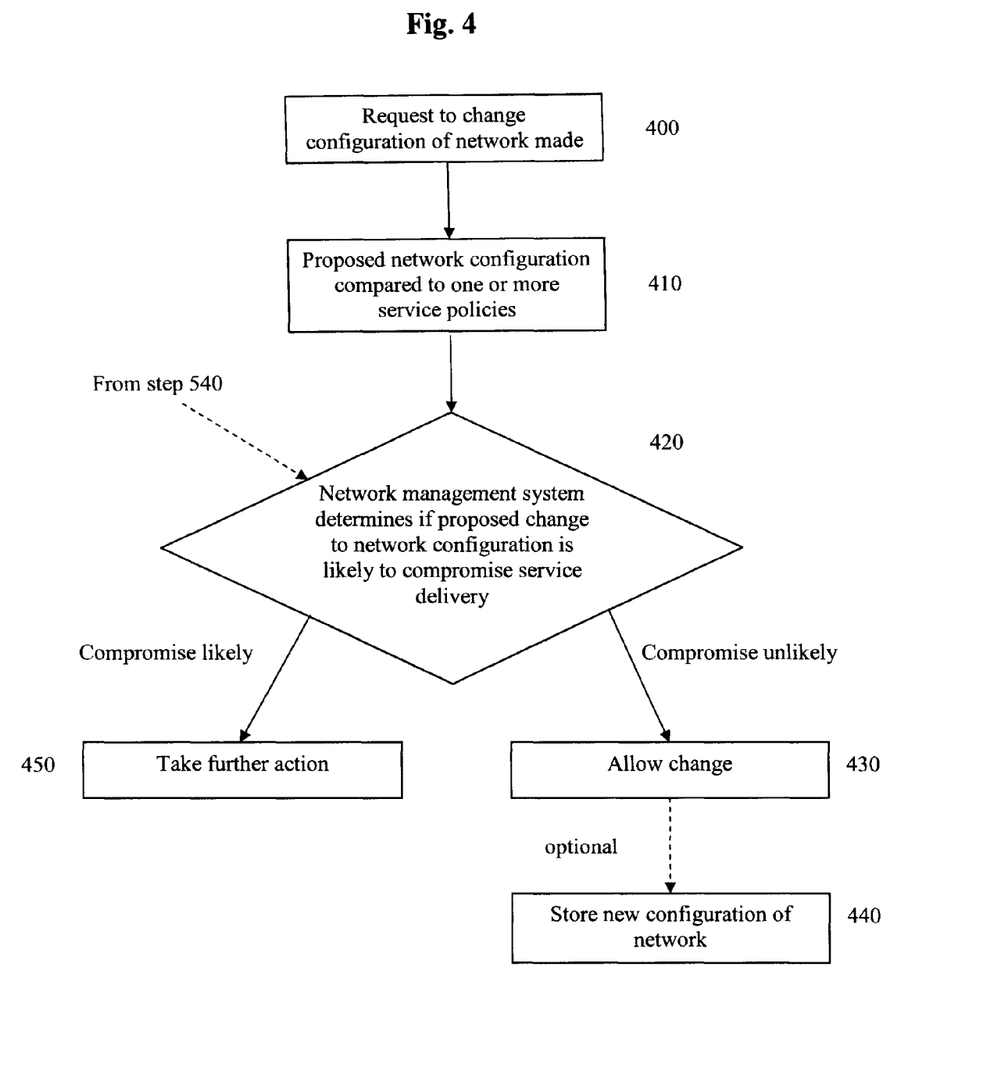
FIG. 4 is a flow diagram showing another network monitoring method according to an embodiment.

Referring now to FIG. 4, in step 400 a request to change the configuration of at least one device in network 100 is made. This request may be made by any authorized entity, such as network administrator 110 or a network engineer. This request is transmitted to the service assurance system associated with network 100, which in the present embodiment comprises configuration management system 115. The setup of configuration management system 115 may be the same as that described in connection with the previous embodiment.

Upon receiving a request to change the network configuration, in step 410 configuration management system 115 compares the proposed network configuration to one or more service policies, and in step 420 configuration management system 115 makes a determination as to whether the proposed network configuration is likely to compromise service delivery. The comparison and determination may be carried out in a manner similar to that of the previous embodiment.

If in step 420 configuration management system 115 determines that the proposed change is unlikely to compromise the delivery of one or more services, in step 430 configuration management system 115 allows the proposed change to the configuration of network 100. This may include contacting the entity that requested the configuration change and informing the entity that it is authorized to proceed and make the configuration change. Alternatively configuration management system 115 may make the configuration change itself, possibly by instructing another entity to make the change. After the configuration change has been made configuration management system 115 may report back to the entity that requested the configuration change that the change has been made.

After the configuration change has been made, in optional step 440 configuration management system 115 may store the new configuration of network 100 in a database such as configuration database 120. The new network configuration may be stored in the form of a network model.

If in step 420 configuration management system 115 determines that the proposed change is likely to compromise the delivery of one or more services, in step 450 configuration management system 115 may take further action. This may include preventing the configuration change from being made and possibly reporting back to the entity that requested the configuration change that their request has been disallowed, optionally with one or more reasons as to why the request has been disallowed. The reasons may include an identification of the service(s) that configuration management system 115 determined that the proposed network change would adversely affect and may specify the severity to which the service(s) were expected to be affected. Configuration management system 115 may log the disallowed request and may contact network administrator 110 to inform it that the request was made and subsequently disallowed.

In step 450 configuration management system may contact an appropriate authority, such as network administrator 110, to request a decision on whether the proposed network change should be allowed. To assist network administrator 110, configuration management system 115 may provide an identification of the service(s) that it determined that the proposed network change would adversely affect and may specify the severity to which the service(s) were expected to be affected. Configuration management system 115 may then wait until network administrator 110 has made a decision to allow or disallow the proposed configuration change and then act in accordance with said decision. If the configuration change is allowed, configuration management system 115 may store the new configuration of network 100 in a database such as configuration database 120.

Configuration management system 115 may keep a log of all requested network changes, including information such as a unique identifier for the entity that requested the configuration change, the date and time the change was requested and/or the date and time at which the configuration change was made or disallowed.

Whether the proposed change is allowed or not, configuration management system 115 may identify all of the services that are dependent on the devices in network 100 that are affected by the request to change the configuration of network 100 made in step 400. This information may be made available to the entity requesting the change and/or an appropriate authority such as network administrator 110 and/or a network engineer, and/or this information may be stored in a log in a database such as configuration database 120. This advantageously allows the full network-wide impact of a requested change to be tracked.

It will be appreciated that the present embodiment advantageously allows a potentially disruptive network configuration change to be prevented before it has even been applied to the network. A workaround or alternative solution may then be developed that does not detrimentally impact upon the delivery of one or more services and this may then be safely implemented with little or no disruption of service.

An extension to the method of FIG. 4 according to an embodiment will now be described with reference to FIG. 5. As before, there are some similarities between embodiment and the preceding embodiments, so for the sake of brevity description of like elements will not be duplicated.

Figure 5:
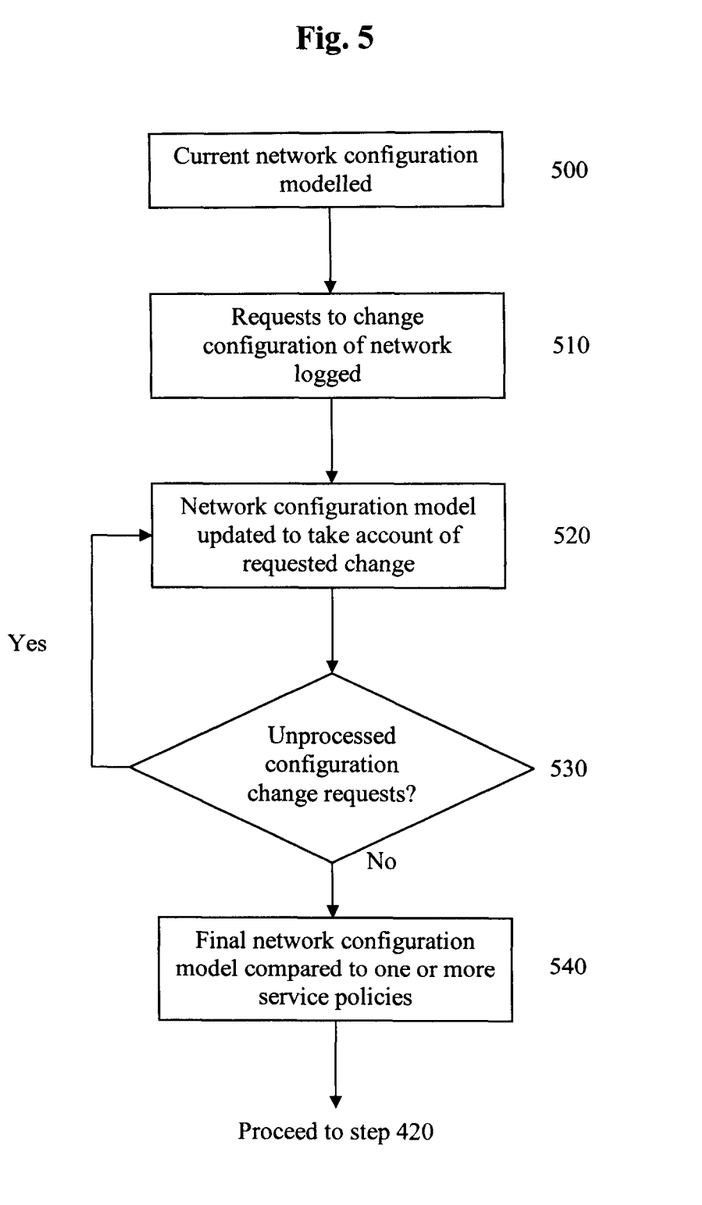
FIG. 5 is a flow diagram showing a further network monitoring method according to an embodiment.

Referring now to FIG. 5, in step 500 the configuration of network 100 is modelled to create a network configuration model. The modelling may be carried out by configuration management system 115 and may be stored in a permanent storage such as configuration database 120.

In step 510 a plurality of requests to change the configuration of network 100 are received and logged by configuration management system 115. Each request is similar to a request as described earlier in connection with the embodiment of FIG. 4. Following the plurality of requests, in step 520 the network configuration model is updated by configuration management system to take account of a requested configuration change. In step 530 configuration management system 115 determines if it has any unprocessed change requests in its log. If it determines that it does, it returns to step 520 and applies the next configuration change request to the network model. This process is repeated until configuration management system 115 determines that it has no unprocessed change requests stored in its log. The change requests may be applied in a First In First Out (FIFO) order, or they may be applied in a random order, or according to some other parameter such as priority.

Once configuration management system 115 has determined that it has no unprocessed change requests stored in its log, it moves on to step 540 in which the final network configuration model that has resulted from the iterative application of successive change requests is compared to one or more service policies of the type described earlier in connection with FIG. 2. Configuration management system 115 then proceeds to carry out the method of FIG. 4, starting at determination step 420, where a determination is made as to whether the final network configuration is likely to compromise service delivery.

The method of the present embodiment advantageously allows the net effect of a series of proposed network changes to be assessed. This allows relationships between the changes that may not have been apparent when each change is viewed in isolation to become clear, potentially resulting in more effective network management.

It will be appreciated by a person skilled in the art having the benefit of the teaching provided herein that the methods shown in FIG. 3 and FIG. 4 are complementary and may be implemented together by a single network management system. In such an implementation, forming a further embodiment, making a request to change a network configuration may be optional. The network management system may proceed according to FIG. 3, periodically polling network 100 for configuration changes, until a request is received to make a change to configuration of network 100. The network management system may then proceed according to FIG. 4 (or FIG. 5 in the case a number of change requests are made), returning to monitoring the network according to FIG. 3 once the method of FIG. 4 has been completed.

Further modifications may be made to any of the methods described herein, and such modifications are intended to fall within the scope of the present invention.

The invention claimed is:

1. A method for managing network configurations of a data processing system, comprising:
   obtaining, by the data processing system, first configuration information for a set of network devices operatively coupled to a network;
   storing, by the data processing system, the first configuration information for the set of network devices in a configuration database;
   determining, by the data processing system, one or more required configuration changes to one or more devices in the set of network devices to provide a configured set of network devices that enable a service provided at an end user device;

enabling the service by configuring the one or more devices according to the one or more required configuration changes;

determining, by the data processing system responsive to configuring the one or more devices, updated configuration information for the set of network devices;

comparing the first configuration information for the set of network devices with the updated configuration information for the set of network devices;

generating, by the data processing system, at least one service policy representing a set of network configuration information elements for the configured set of network devices that enable the service, wherein the at least one service policy is based at least in part on the comparing step, and saving, by the data processing system, the at least one service policy in association with the service;

determining, by the data processing system, whether a proposed configuration change to the set of network devices complies with the at least one service policy; and generating, by the data processing system, a notification if the proposed configuration change does not comply with the at least one service policy.

2. The method of claim 1, further comprising:
performing an operation if the updated configuration information does not comply with the at least one service policy.

3. The method of claim 2, wherein the subsequent operation comprises backing out the one or more configuration changes.

4. The method of claim 2, wherein the subsequent operation comprises generating a notification that the updated configuration information does not comply with the at least one service policy.

5. The method of claim 2, wherein the step of performing the one or more configuration changes comprises applying a set of one or more service provisioning instructions to devices in the set of network devices.

6. The method of claim 1, wherein the first configuration information comprises details of a network configuration and hardware for each of the set of network devices, and the at least one service policy comprises a set of conditions to which device configurations of the one or more devices must adhere in order to ensure delivery of the service.

7. The method of claim 6, wherein the first configuration information is obtained by polling the network configuration for each one of the set of network devices.

8. The method of claim 1, further comprising:
configuring the end user device to receive the service, wherein the updated configuration information comprises details of a network configuration and hardware for the end user device.

9. The method of claim 1, wherein configuration changes are created by the comparing step and correlated with the service.

10. A data processing system for managing network configurations for service enablement, comprising:
a data store device comprising first configuration information obtained for a set of network devices operatively coupled to a network; and
a processor operatively coupled to a memory device having stored therein instructions that are operable to cause the data processing system to perform, when executed by the processor, steps of:
determining one or more required configuration changes to devices in the set of network devices to provide a configured set of network devices that enable a service provided at an end user device; enabling the service by configuring the one or more devices according to the one or more required configuration changes; determining, by the data processing system responsive to configuring the one or more devices, updated configuration information for the set of network devices; comparing the first configuration information for the set of network devices with the updated configuration information for the set of network devices; generating at least one service policy representing a set of network configuration information elements for the configured set of network devices that enable the service, wherein the at least one service policy is based at least in part on the comparing step; saving the at least one service policy in association with the service; determining whether a proposed configuration change to the set of network devices complies with the at least one service policy; and generating a notification if the proposed configuration change does not comply with the at least one service policy.

11. The data processing system of claim 10, wherein the first configuration information comprises details of a network configuration and hardware for each of the set of network devices, and the at least one service policy comprises a set of conditions to which device configurations of the one or more devices must adhere in order to ensure delivery of the service.

12. The data processing system of claim 11, wherein the first configuration information is obtained by polling the network configuration for each one of the set of network devices.

13. The data processing system of claim 10, further comprising:
configuring the end user device to receive the service, wherein the updated configuration information comprises details of a network configuration and hardware for the end user device.

14. A computer program product comprising program code embodied on a non-transitory recording component, the program code configured to control performance of operations on a data processing apparatus on which the program code executes, to perform steps of:
obtaining first configuration information for a set of network devices operatively coupled to a network;
storing the first configuration information for the set of network devices in a configuration database;
determining one or more required configuration changes to one or more devices in the set of network devices to provide a configured set of network devices that enable a service provided at an end user device;
enabling the service by configuring the one or more devices according to the one or more required configuration changes;
determining, responsive to configuring the one or more devices, updated configuration information for the set of network devices;
comparing the first configuration information for the set of network devices with the updated configuration information for the set of network devices;
generating at least one service policy representing a set of network configuration information elements for the configured set of network devices that enable the service, wherein the at least one service policy is based at least in part on the comparing step, and saving the at least one service policy in association with the service;

determining whether a proposed configuration change to the set of network devices complies with the at least one service policy; and generating a notification if the proposed configuration change does not comply with the at least one service policy.

15. The computer program product of claim 14, wherein the first configuration information comprises details of a network configuration and hardware for each of the set of network devices, and the at least one service policy comprises a set of conditions to which device configurations of the one or more devices must adhere in order to ensure delivery of the service.

16. The computer program product of claim 15, wherein the first configuration information is obtained by polling the network configuration for each one of the set of network devices.

17. The computer program product of claim 14, further comprising:

configuring the end user device to receive the service, wherein the updated configuration information comprises details of a network configuration and hardware for the end user device.

* * * * *